United States Patent
Dunklau

(10) Patent No.: US 11,879,467 B1
(45) Date of Patent: Jan. 23, 2024

(54) FOG GENERATOR

(71) Applicant: Dana P. Dunklau, Delavan, WI (US)

(72) Inventor: Dana P. Dunklau, Delavan, WI (US)

( * ) Notice: Subject to any disclaimer, the term of this patent is extended or adjusted under 35 U.S.C. 154(b) by 0 days.

(21) Appl. No.: 17/112,083

(22) Filed: Dec. 4, 2020

Related U.S. Application Data

(63) Continuation-in-part of application No. 16/874,315, filed on May 14, 2020.

(60) Provisional application No. 62/847,679, filed on May 14, 2019.

(51) Int. Cl.
| | |
|---|---|
| *F04D 15/02* | (2006.01) |
| *F04D 15/00* | (2006.01) |
| *B05B 1/26* | (2006.01) |
| *A01M 1/02* | (2006.01) |

(52) U.S. Cl.
CPC .......... *F04D 15/0218* (2013.01); *B05B 1/265* (2013.01); *F04D 15/0066* (2013.01); *A01M 1/02* (2013.01)

(58) Field of Classification Search
CPC .. F04D 15/0066; F04D 15/0218; F04D 35/06; A01M 1/02; A01M 7/0089; B05B 9/06; B05B 1/262; B05B 1/265; B05B 1/267
See application file for complete search history.

(56) References Cited

U.S. PATENT DOCUMENTS

| | | | | |
|---|---|---|---|---|
| 3,894,691 A | | 7/1975 | Mee | |
| 4,349,156 A | * | 9/1982 | Haruch | B05B 1/042 239/432 |
| 5,257,911 A | * | 11/1993 | Mota | F04D 15/0218 417/63 |
| 9,457,366 B2 | * | 10/2016 | Landmer | B05B 7/0433 |
| 2013/0091757 A1 | * | 4/2013 | Victorio da Costa | A01M 13/00 43/125 |
| 2020/0070194 A1 | * | 3/2020 | Williams | B05B 15/40 |

FOREIGN PATENT DOCUMENTS

| | | | | |
|---|---|---|---|---|
| SE | 467648 B | * | 8/1992 | B05B 1/262 |

* cited by examiner

*Primary Examiner* — Philip E Stimpert
(74) *Attorney, Agent, or Firm* — BrownWinick Law Firm; David M. Breiner

(57) ABSTRACT

Disclosed is a system for creating a fog. In one nonlimiting example embodiment, the system includes a pump, a motor configured to drive the pump, a first controller configured to control the motor, a reservoir configured to hold a liquid, a first conduit configured to transfer the liquid to the pump, a second conduit configured to transfer the liquid from the pump to a nozzle, a high pressure sensor configured to detect pressure within the system, wherein the nozzle includes a surface upon which the liquid shatters and turns into the fog and wherein a pressure on a pressure side of the pump does not exceed 3000 psi.

20 Claims, 5 Drawing Sheets

FOG GENERATOR

CROSS-REFERENCE TO RELATED APPLICATIONS

This application is a continuation in part of U.S. patent application Ser. No. 16/874,315 filed with the United States Patent and Trademark Office on May 14, 2020 which in turn claims the benefit of U.S. Provisional Patent Application No. 62/847,679 which was filed with the United States Patent and Trademark Office on May 14, 2019, the entire contents of each of which is herein incorporated by reference.

BACKGROUND

1. Field

Example embodiments relate to a system configured to convert a liquid to a fog and disperse the fog. The fog may include, but is not required to include, an insecticide, a disinfectant, and/or an antimicrobial agent. In example embodiments the fog may be applied over a relatively large area or a relatively small area.

2. Description of the Related Art

Often times large areas of land are infested by large numbers of mosquitos. Many times, ground based foggers are used to introduce a fog having an insecticide therein to kill the mosquitos. Most conventional foggers convert a liquid to a fog by applying energy to the liquid. This is generally done in several ways. Some, for example, use an air blast to transfer energy to the liquid. Most of these systems use an 18 horsepower engine and generally convert about 15 ounces of liquid to fog in one minute. Other systems use rotary atomizers. These systems generally use a porous material which is spun at around 30,000 RPMs. In these systems liquid is injected into the center. As the liquid is spun it separates into a fog. Systems using rotary atomizers generally convert about 15 ounces of liquid to fog in one minute. Other systems pass pressurized water through a nozzle at around 5,000 to 7,000 psi. Most fogging equipment is relatively expensive and difficult to use. As such, there is a need for a fogging apparatus which can generate a large volume of fog which is in expensive and easy to use.

SUMMARY

In general, example embodiments are drawn to system configured to generate and disperse a fog. The system may include a reservoir for holding a liquid, a pump to pump the liquid through the system, a nozzle to convert the liquid to a fog, and various safety features, for example, a level cutoff switch, a safety relief valve, and a high pressure switch. The system may be portable and may be supported on a vehicle, for example, a car, a truck, or a cart. The system may be configured so that the volume of fog dispersed by the system is dependent on the speed the vehicle travels. In example embodiments the nozzle may resemble a fish hook like structure. One side of the fish hook like structure is attached to the side of the nozzle. The nozzle also includes a small flat surface positioned directly in front of the nozzle opening. So, the nozzle creates a jet out of the liquid. Immediately after leaving the nozzle opening the jet hits the surface and shatters into a fog. The inventor has found this to be an extremely efficient method of applying energy to a liquid. In example embodiments, the nozzle has the ability to convert 2-20 oz/min which may operate under a pressure of 3,000 psi or less. The nozzle may be part of a manifold which may be configured to support several nozzles having an identical configuration. An example embodiment of the inventor's system is capable of converting 64 oz/min. The amount that may be converted can increase by selecting the proper pump and using additional nozzles.

BRIEF DESCRIPTION OF THE DRAWINGS

Example embodiments are described in detail below with reference to the attached drawing figures, wherein.

DETAILED DESCRIPTION

Figure 1:
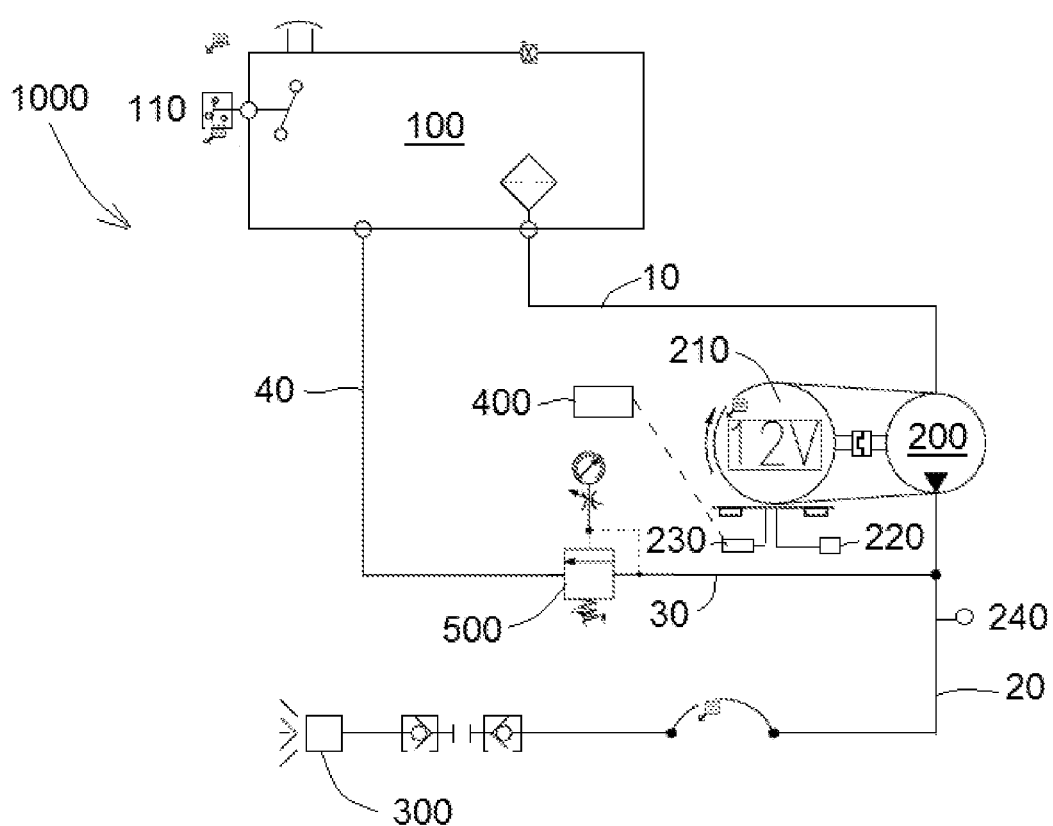
FIG. 1 is a view of a system in accordance with example embodiments.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a system capable of converting a liquid to a fog.

FIG. 1 is a view of a system 1000 configured to convert a liquid to a fog and dispense the fog to the environment. The liquid may include chemicals, such as insecticides, to kill various pests, for example, mosquitos and/or flies, that may be in the environment. The liquid may also include chemicals, such as sanitizers and antifungals, to kill various pathagens and fungi, for example, ebola, COVID 19 and black mold, that may be in the environment. In example embodiments, the liquid may include, but is not required to include, a disinfectant, and/or an antimicrobial agent. In example embodiments, the liquid may include, but not limited to, a natural pyrethrum or synthetic pyrethroid such as permethrin, deltamethrin, bifenthrin, fluvalinate, fenvalerate, esfenvalerate, lambda cyhalothrin, tetramethrin, tralomethrin, cyfluthrin, resemethrin, sumithrin, imiprothrin, prallethrin (ETOC®), allethrin, bioallethrin, esbiothrin, s-bioallethrin (ESBIOL®), d-allethrin; cypermethrin; isomeric forms thereof such as zeta cypermethrin and tau fluvalinate; channel blocking insecticide such as a phenyl pyrazole (fipronil); acetylcholinesterase inhibitor such as a carbamate (carbaryl and bendiocarb); oxadiazines such as indoxacarb; organophosphate such as a chlorpyriphos (DURSBAN®) and acephate (ORTHENE®); neonicotinoid insecticide such as dinotefuran (SHURIKEN®); thiamethoxam; imidacloprid; acetamiprid; thiacloprid; clothianidin; nitenpyran; insect growth regulator such as benzoylphenyl urea (such as diflubenzuron (DIMILIN®), teflubenzuron, flufenoxuron, bistrifluoron, hexaflumuron; juvenile hormone mimic such as pyriproxifen (SUMILARV®), methoprene and fenoxycarb; fermentation insecticide such as abamectin, spiromesifen, spinosad and *Bacillus thuringiensis*; plant oil insecticide such as cinnamon, rosemary, wintergreen, citrus and clove oils; acaracide; miticide; fungicide; herbicide and combinations thereof. Disinfectants or pesticides that exhibit advantageous results with the system 1000 and are currently in the marketplace are formaldehyde, oxine, Synergize, Tek-trol, Bio-Phene, Virkons, Virocid and 904, n-Alkyl (60% C14, 30% C16, 5% C12, 5% C18) Dimethyl benzyl ammonium chloride (Amount 2.25%) n-Alkyl (68% C12, 32% C14) Dimethyl benzyl ammonium chloride (Amount 2.25%); 3-(trimethoxysilyl) propyl dimethyl octadecyl ammonium chloride CAS #27668-52-6; Alkenyl* dimethyl ammonium chloride *(75% C18', 25% C16'); Alkyl dimethyl ethylbenzyl ammonium cyclohexyl sulfamate CAS #71808-54-3 CAS #37335-68-5; Alkyl trimethyl ammonium bromides CAS #68424-92-0; Alkyl* dimethyl benzyl ammonium chloride *(41% C14, 28% C12, 19% C18, 12% C16 CAS #68391-01-5; Decyl-N-methyl-N-(3-trimethoxysilyl)propyl)-1-decanaminium chloride CAS #68959-20-6; Diallyl dimethyl ammonium chloride polymers CAS #26062-79-3; Didecyl dimethyl ammonium chloride CAS #7173-51-5; Dodecylbenzyl trimethyl ammonium chloride CAS #1330-85-4; N-isononyl-N,N-dimethyl decanaminium chloride CAS #138698-36-9; Octyl decyl dimethyl ammonium chloride CAS #32426-11-2; Oxydiethylene bis(alkyl dimethyl ammonium chloride), alkyl derived from coconut oil fatty acids CAS #68607-28-3; Tetradecyl dimethyl benzyl ammonium chloride CAS #139-08-2; Ortho-benzyl-para-chlorophenol CAS #120-32-1; Ortho-benzyl-para-chlorophenol, sodium salt CAS #3184-65-4; Para-chloro-meta-cresol CAS #59-50-7; Sodium p-chloro-m-cresolate CAS #15733-22-9; Triclosan CAS #3380-34-5; Naled (1,2-dibromo-2,2-dichloroethyl dimethyl phosphate); and Hydrogen Peroxide. In one nonlimiting example embodiment, the system 1000 may be mounted on a back of a truck. Thus, the system 1000 may be mobile so the system 1000 may be moved to cover a fairly large area of land. In an alternative embodiment, the system 1000 may be mounted on a push cart and the pushcart may be configured to be pushed by a person either inside or outside of a building. This latter embodiment may be especially useful in decontaminating a building. In yet another embodiment, the system 1000 may be placed in a single location and operated from that location without being moved.

In its most basic form, the system 1000 includes a reservoir 100 for holding the liquid. The liquid, as mentioned above, may include chemicals that act as insecticides, however, the invention is not limited thereto. For example, the system 1000 may hold other chemicals such as, but not limited to, antimicrobial agents, herbicides, pesticides, and/or fertilizers. The reservoir 100 may hold several gallons of liquid, for example, 50 gallons, though the amount of liquid held is not critical to the invention. In practice, the system 1000 may contain multiple reservoirs for different chemicals or flushing. While it was described above that the reservoir 100 may hold 50 gallons of liquid, it may, alternatively, hold more or less than 50 gallons of liquid. Reservoir 100, for example, may hold as little as 1 gallon of liquid.

In example embodiments a pump 200 may be used to pump the liquid through the system 1000. In the nonlimiting example of FIG. 1, the pump 200 may be driven by an electric or internal combustion motor 210, for example, a 12 VDC motor, though the example is not limited thereto. For example, depending on the application a larger or smaller motor may be used. In example embodiments the motor 200 be controlled by a dial 220 which may be part of a rheostat, or some other motor controller, to control the speed of the motor 210. Thus, an operator may increase or decrease the speed of the motor 210 by adjusting the dial 220. Of course, as one skilled in the art would understand, the speed at which the pump 200 operates is affected by the speed of the motor 210. Thus, a user can control the speed at which the pump 200 operates by controlling the speed of the motor 210 which may be controlled by the operation of the dial 220.

In example embodiments, a first conduit 10 may transfer the liquid to from the reservoir 100 to the pump 200. The first conduit 10 may, for example, resemble a flexible hose. The flexible hose may be made from a plastic or other similar material appropriate for the chemical being used. In another embodiment the first conduit 10 is a nonflexible conduit and may resemble a metallic pipe or tube appropriate for the chemical being used. In another embodiment the first conduit 10 is a hydraulic hose. Regardless, the conduit 10 is configured to allow the liquid to flow from the reservoir 100 to the pump 200.

In example embodiments a second conduit 20 may transfer the liquid from the pump 200 to a nozzle 300. The nozzle 300 may convert the liquid to a fog for dispersal by the system 1000. The nozzle 300, for example, may be an impact nozzle.

In example embodiments the rate at which the liquid flows through the system 1000 is controlled by the speed of the motor 210 and pump 200. As the motor 210 and pump 200 speed increases, the flow rate of the liquid increases. As the nozzle 300 is too small for free flow of the liquid, pressure develops and increases as the amount of fluid sent to it increases. In example embodiments, the pressure in the system 1000 may be controlled by a user by controlling the dial 220. As the dial is "turned up" the pressure in the system 1000 increases. As the dial is "turned down" the pressure in the system 1000 decreases. A user, therefore, can set the desired pressure in the system 1000 to a desired level by operating the dial 220. Pressure directly correlates with flow. As pressure increases and decreases flow increases and decreases accordingly.

In example embodiments, the system 1000 may be vehicle mounted in order to treat an area for a certain type of pest, for example, mosquitos. In certain circumstances it may be desired to control the amount of fog produced by the apparatus 1000 based on the speed at which the vehicle is driven. The faster the vehicle is driven the greater the speed at which the pump 200 may be driven. In order to allow for the proper production of fog the system 1000 may include a variable flow controller 230. The variable flow controller 230 may control the motor 210 speed based on the speed of the vehicle on which the system 1000 is mounted. For example, as the speed of the vehicle increases the variable flow controller 230 would increase the speed at which the motor 210 is driven. Similarly, as the speed of the vehicle decreases, the variable flow controller 230 would decrease the speed at which the motor 210 is driven. This example, of course, is not meant to limit the invention. For example, in another embodiment, the valve 500 may be controlled based on a speed of the vehicle. For example, the faster the vehicle drives the more closed the valve 500 may be to increase pressure in the system and produce more fog. Alternatively, as the vehicle is driven slower the valve 500 may be more open to reduce pressure in the system to produce less fog. Thus, in this latter embodiment, the motor may run at a constant speed while the vehicle is moving and the amount of fog produced is controlled by controlling the valve 500.

The variable flow controller 230 and/or valve 500 may determine the speed of the truck in various ways. In a first nonlimiting example embodiment, the system 1000 may include a GPS device 400 which gathers GPS data and sends the GPS data to the variable flow controller 230 and/or valve 500 either wirelessly or over a wire and the variable flow controller 230 and/or valve 500 may use the GPS data to determine the speed at which the truck is moving. In other words, the variable flow controller 230 and/or valve 500 may have circuitry with electrical components configured to determine how fast the system 1000 is traveling based on the GPS data. In another embodiment, the vehicle may be equipped with a blue tooth device which may allow data related to speed of the vehicle to be sent to the variable flow controller 230 and/or valve 500 from the vehicle's onboard computer. In yet another embodiment, the system may include an electronic controller connected to the cloud and the electronic controller may receive location information from the cloud which may be used by the electronic controller to determine the speed at which the system 1000 is driven and this electronic controller may control system 1000 accordingly. In yet another embodiment, the system 1000 may be Bluetooth enabled and may connect to an application of a smart device, for example, a smart phone or a tablet, and the Bluetooth device may include an app which receives location information and the smart device may operatively control the speed at which the motor 210 operates and/or controls how open the valve 500 should be.

In example embodiments, pressure in the system 1000 may controlled by the pump 200 and motor 210 speed. In the particular embodiments shown in this application, pressure on the pressure side of the pump 200 is generally limited to be in a range of 700 psi to 3000 psi, and more preferably between 1000 psi and 2000 psi, and even more preferably between 1000 psi and 1500 psi. However, there is a risk, especially with a clogged nozzle 300, that pressure can increase in an uncontrolled manner which may exceed pressures beyond which system 1000 can safely accommodate. Another potential hazard could occur if the reservoir 100 runs out of liquid. Therefore, system 1000 may further include one or more safety features. For example, in one nonlimiting example embodiment, system 1000 includes a level cutoff switch 110. The level cutoff switch 110 may sense a level of liquid within the reservoir 100 and may stop the system 1000 from functioning in the event the level of liquid in the reservoir 100 falls below a preset value. This prevents the pump 200 from operating in a dry state. An example of the level cutoff switch 110 is a low level cut-off switch. In addition, the system 1000 may include a High Pressure Switch 240. The High Pressure switch 240 may sense pressure in the system 1000, for example, pressure in the second conduit 20, and may stop the system 1000 from functioning in the event the pressure in the second conduit 20 exceeds a preset value. Though the embodiment of FIG. 1 shows the high pressure switch 240 as being in a position to sense of pressure of the system 1000 by sensing a pressure of the second conduit 20, it may alternatively sense a pressure in a third conduit 30 instead. In fact, the inventive concepts cover any embodiment where the high pressure switch 240 senses a pressure on a pressure side of the pump 200. The system 1000 may include additional safety systems. For example, the system 1000 may further include a third conduit 30 which branches off the second conduit 20. The third conduit 30 may direct the pressurized liquid from the pump 200 to a valve 500, which may be a safety relief valve, which may open when the pressure in the third conduit 30 exceeds a set value of the pressure relief valve 500. When the pressure in the third conduit 30 exceeds the safety relief valve's 500 set pressure, the safety relief valve 500 opens so that at least some of the liquid pumped by the pump 200 is returned to the reservoir 100 via a fourth conduit 40. It is understood that the valve 500 may operate as a safety relief valve and may also be controllable to control pressure in system 1000. In example embodiment, valve 500 may represent two valves, on as a traditional safety relief valve and the other as a controllable valve which is configured to control an amount of liquid passing through the third conduit 30 or the fourth conduit 40.

Figure 5:
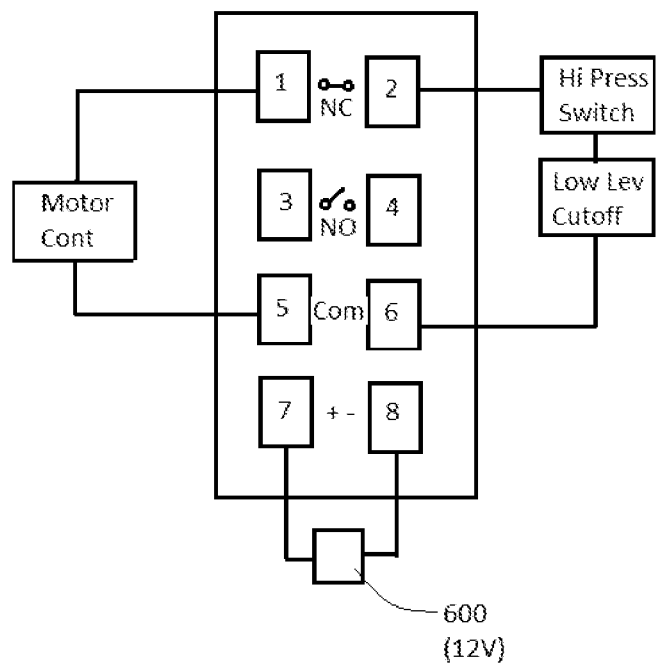
FIG. 5 represents circuit relays in accordance with example embodiments.
Figure 5:
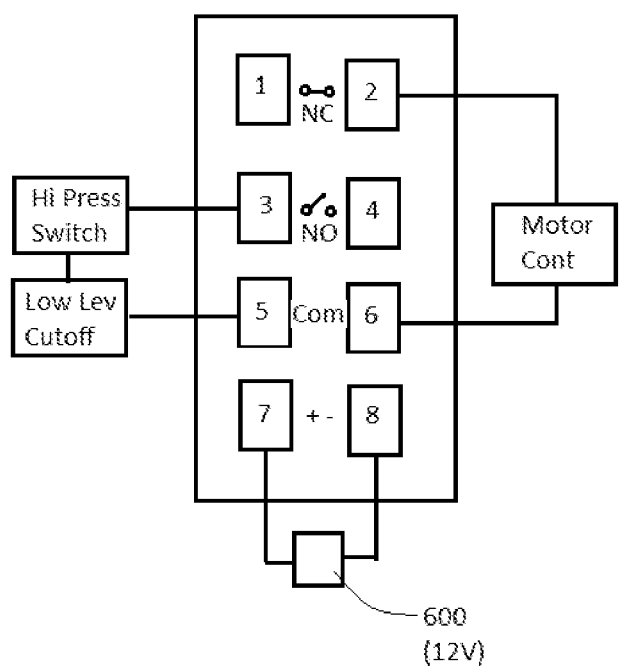

In example embodiments the system 1000 may include an electrical system to control the motor 210. The electrical system may route power from a power source 600, for example, a battery or an AC power source, first through the level cutoff switch 110, then to the high pressure switch 240 before being routed to the motor 210. Thus, the motor 210 won't operate in the event the reservoir 100 is not filled with enough liquid. In the event the reservoir 100 is filled to the proper level power will flow next to the high pressure switch 240 which detects pressure within the system 1000. If the pressure is above a pre-set value, the high pressure switch 240 will prevent power from flowing to the motor 210. FIG. 5 illustrates a couple of nonlimiting examples of relays usable in example embodiments. The top nonlimiting example shows a relay configured as a normally closed relay whereas the bottom example shows a relay configured as a normally open relay. In either case, power from a power source, for example, a 12 Volt battery, may be attached to the relay at 7 and 8 and the relays may control power to a motor controller based on whether a fault is detected. For example, if either of pressure sensor detects pressure on the pressure side of the pump in system 1000 is too high or if the low level switch indicates there is not enough liquid in the reservoir, then power to the motor controller may be shut off and/or power within the system is disrupted.

In example embodiments, the system 1000 may further include a fan 700 which may, in one embodiment, sit behind the nozzle 300 to push and disperse the fog and, in another embodiment, may be placed in front of the nozzle 300 in order to draw the fog out of the nozzle and blow the fog into the environment. In either embodiment, the fan 700 may be an oscillating fan to blow fog in many directions. Of course, in other embodiments, the fan 700 may be omitted. In one embodiment the fan 700 may be configured to turn on when the system 1000 is activated or may, in another embodiment, be operated independent of when system 1000 is powered up. In one embodiment, the fan 700 may have a support tube which may support the nozzle 300.

In example embodiments the set pressure of the safety relief valve may be lower than the pre-set value associated with the high pressure switch 240. This may prevent the system from ever reaching an unsafe pressure level.

As one skilled in the art would readily appreciate, the pressure in system 1000 is controlled by the speed of the pump 200. If the nozzle 300 opening is constant, the faster the pump 200 operates the greater the pressure. If extra nozzles are added (via a nozzle manifold) the pump 200 must be operated faster to build pressure to a desired range. By adding and subtracting nozzles via the manifold and using smaller or larger pumps, virtually an unlimited amount of fog can be produced. This, however, is not intended to limit example embodiments. For example, safety relief valve 500 may be configured to controllably open or close and may be used to control a pressure in the system 1000. For example, the pump 200 may be operated at a constant speed and a pressure of the system 1000 on a pressure side of the pump 200 may be controlled by controlling the opening and closing of the valve 500. Opening the valve 500 reduces the pressure in the system whereas closing the valve 500 increases the pressure. Thus, in this latter embodiment, pressure in the system 1000 may be controlled by controlling the opening and/or closing of valve 500 rather than by varying the speed of the pump 200.

Figure 2:
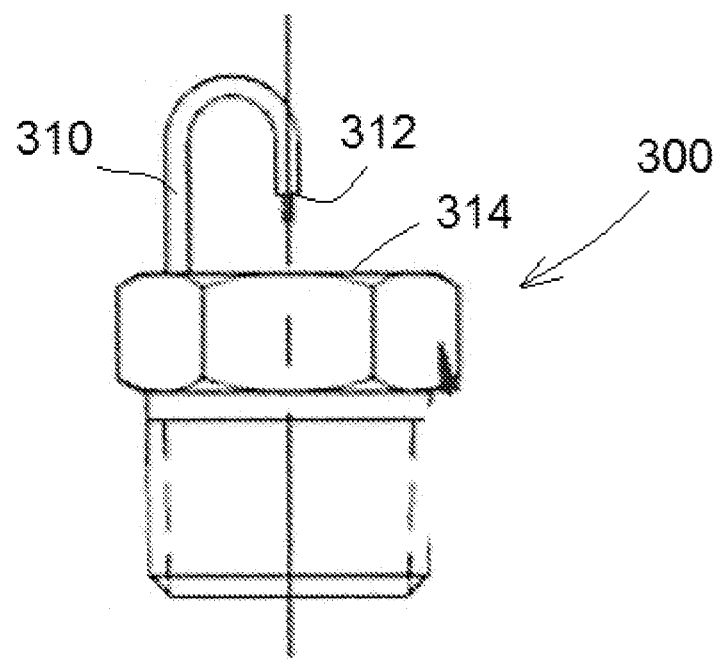
FIG. 2 is a view of a nozzle in accordance with example embodiments.
Figure 3:
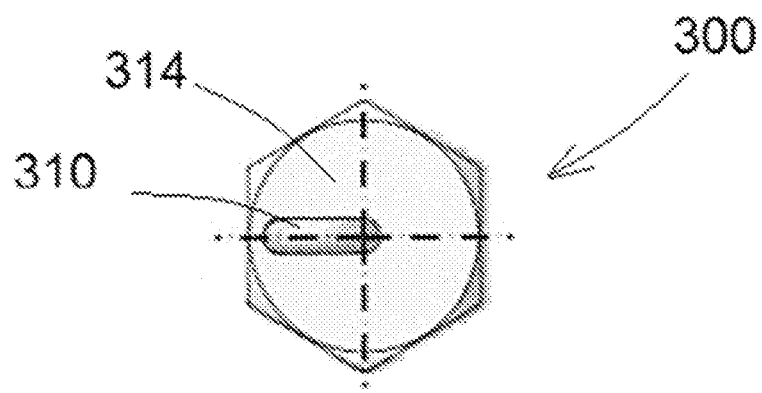
FIG. 3 is another view of the nozzle in accordance with example embodiments.
Figure 4:
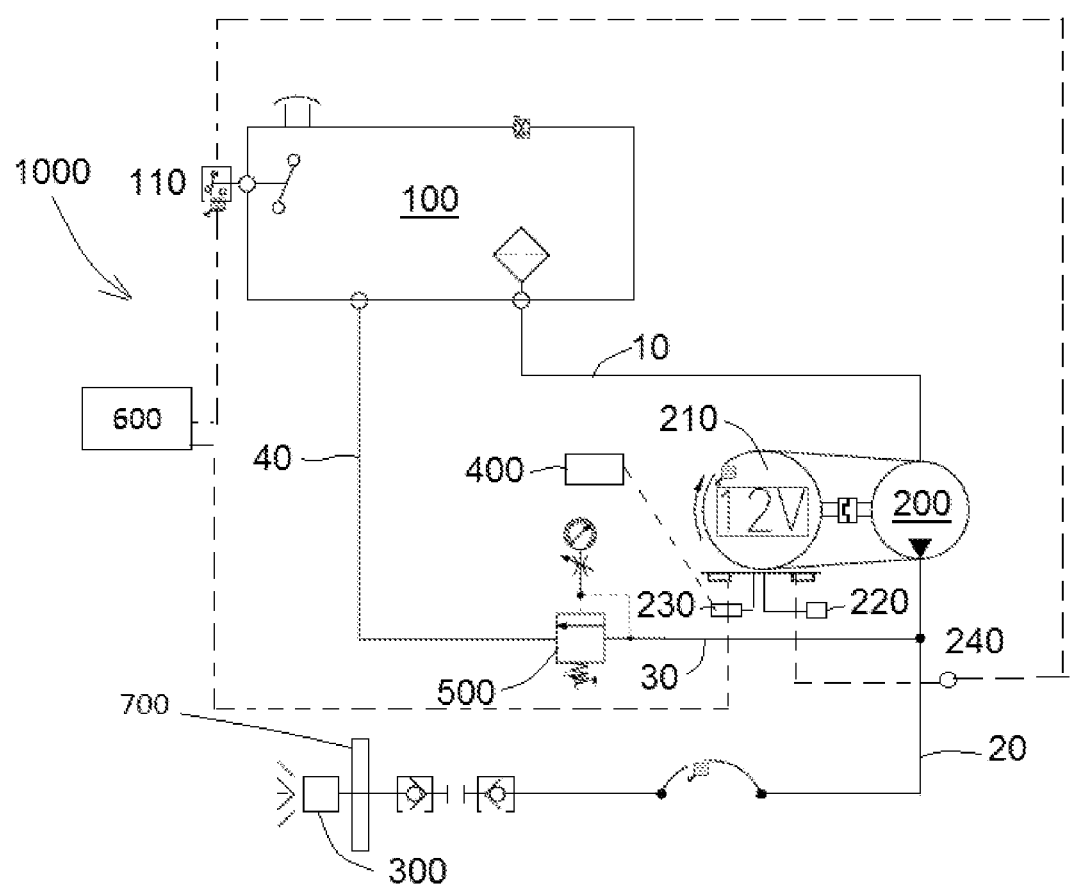
FIG. 4 is a view of a system in accordance with example embodiments.

FIG. 2 is a view of the nozzle 300. As shown in FIG. 2, the nozzle 300 includes a hollow J-shaped structure 310 having an outlet 312 that directs the pressurized liquid to a flat surface 314 where the liquid shatters and turns into a fog. The nozzle 300 has an ability to convert 2 to 20 oz of liquid to fog per minute while being kept under a pressure of under 3000 psi. Though not shown in the figures, a manifold may be provided which may include one or more nozzles 300. The additional nozzles 300 translates into greater fog production. It should be noted that the inventor has found that rapidly moving liquid being directed onto a surface, for example, a flat surface, is surprisingly efficient at converting the liquid to fog.

In example embodiments the system 1000 may be vehicle mounted, but the system may also be used in a stationary setting. For example, the system 1000 may be placed on a truck or a pushcart or may alternatively be placed in a designated spot in a building to produce fog. The system 1000 may be used to fumigate an outdoor area, but may also be used to fumigate and indoor area as well. The system may be controlled to function as a ULV fogger configured to generate fog having sizes of 30 microns or less.

Figure 6:
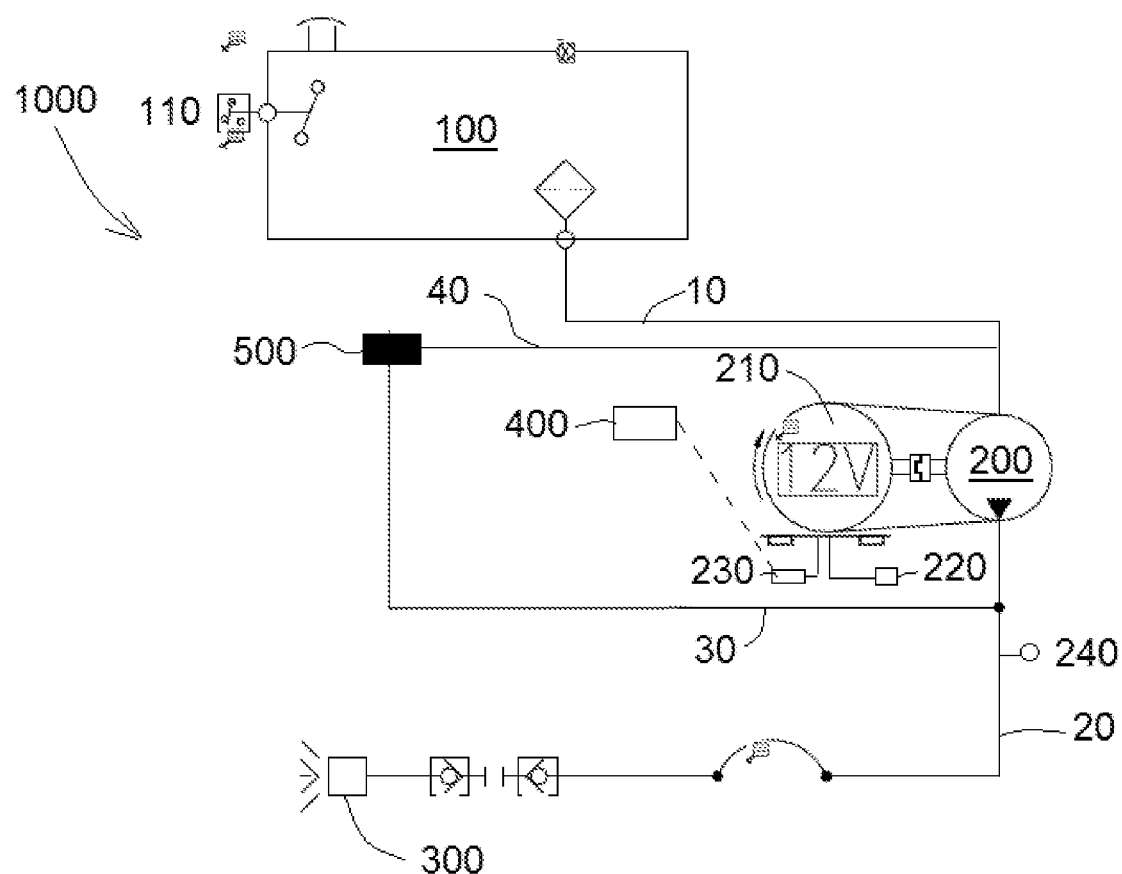
FIG. 6 is a view of a system in accordance with example embodiments.

FIG. 6 is another example of a system 1000 configured to generate and deliver a fog in accordance with example embodiments. The system 1000 of FIG. 6 is similar to the previously described systems, as such, a detailed description thereof is omitted for the sake of brevity. However, it should be noted that in FIG. 6, the valve 500, which may be a safety relief valve, an unloader valve, or a pressure regulator valve, may be configured to recirculate pumped liquid back to the pump 200 via a conduit 40. As in the other embodiments, the valve 500 may prevent excessive pressure, for example, pressure above 3000 psi, from building up in the system 1000 of FIG. 6 on the pressure side of the pump 200. For example, if the nozzle 300 gets plugged pressure in the second conduit 20 may build up. As the pressure builds the pressure in the third conduit 30 likewise rises as does the pressure in the valve 500. When the pressure exerted on the valve 500 exceeds its set point the valve 500 opens allowing for liquid to flow through the third conduit 30, through the valve 500, through the fourth conduit 400 and back to the pump 200. For example, the fourth conduit 400 may branch into the first conduit 10 or may independently attach to the pump 200. The recirculation system of FIG. 6 (which may be the third conduit, the valve 500, and the fourth conduit 40) may prevent pressure from building up on the pressure side of the pump 200 from exceeding a desired or preset level. In one nonlimiting example embodiment, the valve 500 is configured to recirculate some or all of the liquid pumped by the pump 200 necessary to maintain or limit the system 1000 to a particular pressure. For example, the nozzle 300 of FIG. 6 may be part of a manifold which may be configured to support several nozzles. In this embodiment one or more of the several nozzles may be plugged and thus only a portion of the liquid pumped by the pump 200 to the nozzle 300 need be diverted in the recirculation system to maintain a desired pressure. As an alternative to the embodiment of FIG. 6, pump 200 may be configured with an integrated valve with an internal return for recirculation, thus, the valve 500 may be omitted in its entirety.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What I claim is:

1. A system for creating a fog, comprising:
   a pump;
   a motor configured to drive the pump;
   a first controller configured to control the motor;
   a reservoir configured to hold a liquid;
   a first conduit configured to transfer the liquid to the pump;
   a second conduit configured to transfer the liquid from the pump to a nozzle; and a valve configured to recirculate at least some of the liquid needed to limit a pressure in the second conduit to less than 3000 psi, wherein the fog is created by directing the liquid through a flat surface and thereafter shattering the liquid on the flat surface.

2. The system of claim 1, further comprising:

a level cutoff switch configured to detect a liquid level in the reservoir, wherein the system is configured to shut off if the level cutoff switch detects that the liquid level below a preset liquid level.

3. The system of claim 1, wherein the first controller is a manual controller so a user may manually adjust a speed of the motor.

4. The system of claim 1, wherein the first controller is a variable speed controller.

5. The system of claim 1, further comprising:

a second controller, wherein the first controller is a manual controller so a user may manually adjust a speed of the motor and the second controller is a variable speed controller.

6. The system of claim 1, wherein the first controller is configured to adjust a speed of the motor based on a speed which the system is moving.

7. The system of claim 1, wherein the system is a mobile system and the first controller is configured to adjust a speed of the motor based on a speed which the system is moving.

8. The system of claim 1, wherein the system is a mobile system and the first controller is configured to increase a speed of the pump if the system accelerates and decrease a speed of the pump if the system decelerates.

9. The system of claim 1, wherein the system is a mobile system and the system is configured to receive data from a smart device and use the data to determine how fast the pump operates.

10. The system of claim 1, further comprising:

a third conduit configured to provide pressurized liquid from the pump to the valve.

11. The system of claim 1, wherein the valve is manually adjustable to control pressure of the system on the pressure side of the pump.

12. The system of claim 1, wherein the valve is one of a relief valve, an unloader valve, and a pressure regulator configured to prevent a pressure in the pressure side of the pump from exceeding 3000 psi.

13. The system of claim 1, further comprising:

a high pressure sensor configured to detect pressure within the system, wherein the nozzle includes a flat surface upon which the liquid shatters and turns into the fog.

14. The system of claim 1, wherein the nozzle is configured to convert liquid to fog at a rate of 2-20 oz/min under a pressure of 3,000 psi or less.

15. The system of claim 1, wherein the nozzle forces the liquid to travel along a J-shaped path to create the jet of liquid which, upon striking a flat surface, produces the fog which has sizes of 30 microns or less.

16. The system of claim 1, wherein the fog is created solely by the liquid shattering on the flat surface.

17. A fog generator comprising:

a pump;

a motor configured to drive the pump;

a first controller configured to control the motor;

a reservoir configured to hold a liquid;

a first conduit configured to transfer the liquid to the pump;

a second conduit configured to transfer the liquid from the pump to a nozzle;

a third conduit configured to transfer the liquid from the pump to the reservoir;

a high pressure sensor configured to detect pressure within the system on the pressure side of the pump;

a valve configured to control a flow of the liquid in the third conduit, wherein the nozzle includes a flat surface upon which the liquid passes through and thereafter shatters on the flat surface and turns into the fog and wherein a pressure on a pressure side of the pump does not exceed 3000 psi and wherein the pressure in the system is controlled by one of controlling a speed of the motor and the valve controlling the flow of liquid in the third conduit.

18. The fog generator of claim 17, wherein the nozzle is configured to convert liquid to fog at a rate of 2-20 oz/min and when the jet of liquid of liquid strikes the flat surface produces the fog which has sizes of 30 microns or less.

19. The fog generator of claim 17, wherein the nozzle forces the liquid to travel along a J-shaped path to create the jet of liquid.

20. The fog generator of claim 17, the fog is created solely by the liquid shattering on the flat surface.

* * * * *